C. H. KEWELL.
FRAME FOR LANDING NETS.
APPLICATION FILED AUG. 5, 1914.
1,199,905.
Patented Oct. 3, 1916.
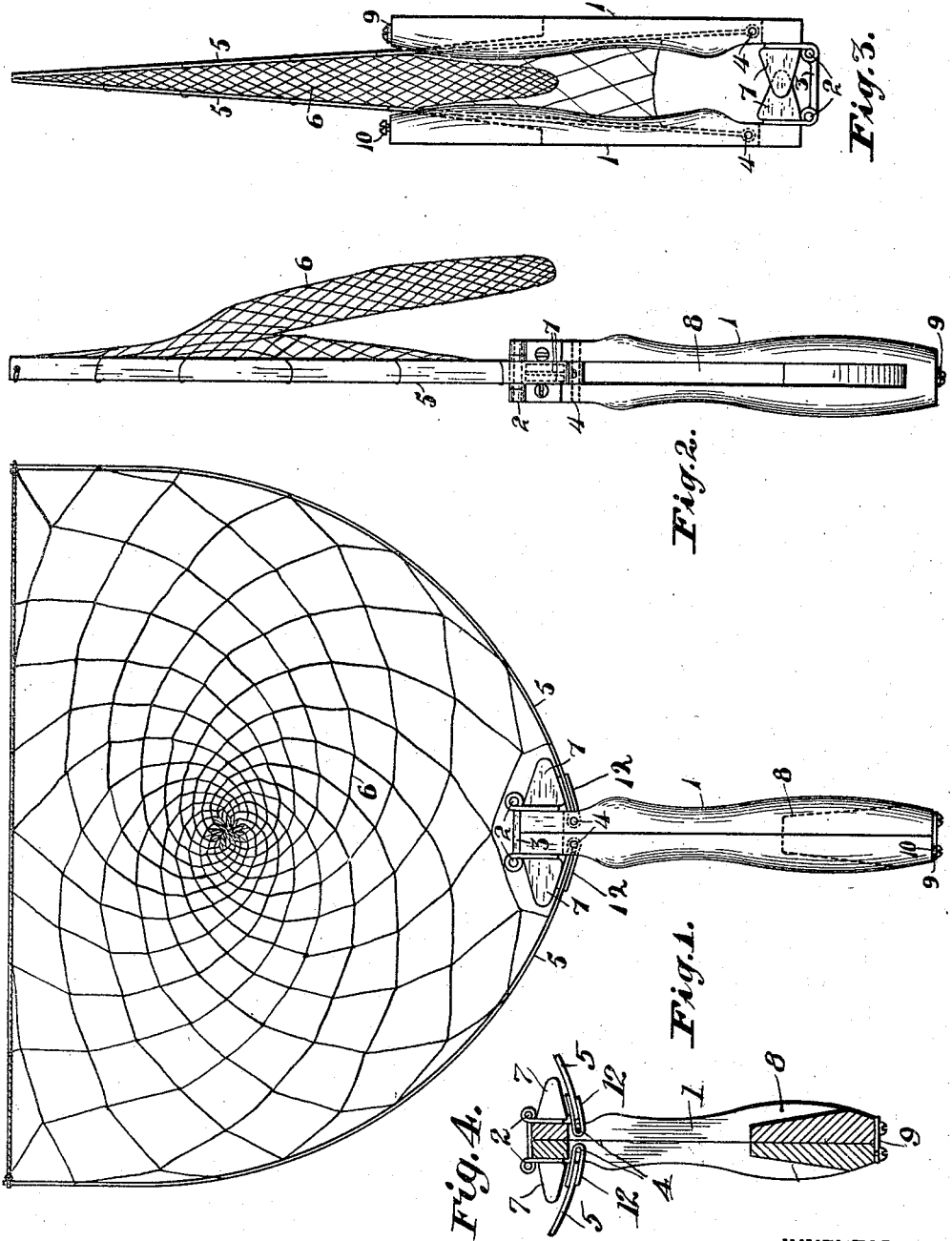
WITNESSES:
INVENTOR.
Charles H. Kewell,
BY Lincoln Sonntag,
ATTORNEY

UNITED STATES PATENT OFFICE.

CHARLES H. KEWELL, OF SAN FRANCISCO, CALIFORNIA.

FRAME FOR LANDING-NETS.

1,199,905.  Specification of Letters Patent.  Patented Oct. 3, 1916.

Application filed August 5, 1914. Serial No. 855,178.

*To all whom it may concern:*

Be it known that I, CHARLES H. KEWELL, a citizen of the United States, residing at San Francisco, in the county of San Francisco and State of California, have invented certain new and useful Improvements in Frames for Landing-Nets, of which the following is a specification.

My invention relates to improvements in frames for landing nets.

The object of my invention herein described is to provide a frame for landing nets which can be reduced to a small compass when not in use by the operation of the handle of the same, wherein part of the frame supporting the netting reposes when the device is folded, and which is simple in construction, and of sufficient strength to meet all conditions of its use.

My invention consists in the novel construction, combination and arrangements of parts shown in the accompanying drawing, described in the following specification and claimed in the appended claims.

In the drawing Figure 1 is a view of said landing net embodying my invention ready for use and Fig. 2 is a side view of the same. Fig. 3 shows the device in a folded position ready for carrying the same. Fig. 4 is a transverse view of the handle 1 parallel to that shown in Fig. 1.

In the figures 1 indicates a handle which has two corresponding parts equally divided, and which are joined at their inner ends by a double-hinge 2 having two side plates secured to the outer sides of said handle as shown. Said hinge is also provided with two oppositely positioned cams 7 projecting therefrom, which engage the lower ends of the branches 5 of the net-supporting frame, and which branches consist of resilient material preferably steel. Clasps 12 pivotally secure the lower ends of said branches of the frame within the recesses 8 of the parts 1 of the handle, said clasps being penetrated by pins 4 extending laterally through said recesses into the material of the handle for their support. By the engagement of said cams with the lower ends of the branches of said frame, said frame is forced to assume a bow-shape for the extension of the net 6 secured thereto as shown. The handle may be secured in a closed position by means of the hook 9 pivotally secured in the outer end of one of the divisions or pieces of said handle by a screw or pin, a pin being secured in the like end of the other division for engagement by said hook to hold the handle in position. The recesses or slots 8 of such handle are provided so that a portion of the resilient branches of the frame may enter the same as shown in Fig. 3 when the device is folded, to permit a smaller compass of such device than otherwise. By drawing the handles 1 together the cams 7 engage the frame 5 and thereby extend the net. The cams 7 when the net is extended being behind the frame and when the device is folded within the handles 1, any tendency to tear the pocket of the user in carrying is eliminated by reason of the non-employment of exposed shanks for the purposes of the device as heretofore employed in the art.

Having thus described my invention, what I desire to secure by Letters Patent and do now claim is:

1. A frame for landing-nets consisting of a handle having two corresponding pieces provided with longitudinal slots, a hinge connecting like ends of said pieces and having cams laterally projecting therefrom, said cams projecting outwardly of said pieces when the frame is extended and within said pieces when the frame is folded, net-supporting resilient branches of said frame connected to said pieces and engageable by said cams and arranged to partly repose within said slots when the frame is folded and means for securing said pieces in engagement upon the expansion of said branches.

2. A frame for landing-nets consisting of a handle having two corresponding pieces provided with longitudinal slots and movably joined at like ends thereof, cams projecting laterally from said pieces in proximity to said ends, said cams projecting outwardly of said pieces when the frame is extended and within said pieces when the frame is folded, net-supporting resilient branches of said frame pivotally connected to said pieces within said slots and engageable by said cams, and arranged to partly repose within said slots when the frame is folded, and means for securing said pieces in engagement upon the expansion of said branches.

In testimony whereof I affix my signature, in presence of two witnesses.

CHARLES H. KEWELL.

Witnesses:
August Olday,
A. McMenomy.